H. J. ROUND.
WIRELESS DIRECTION FINDER.
APPLICATION FILED SEPT. 13, 1920.
1,368,657.
Patented Feb. 15, 1921.
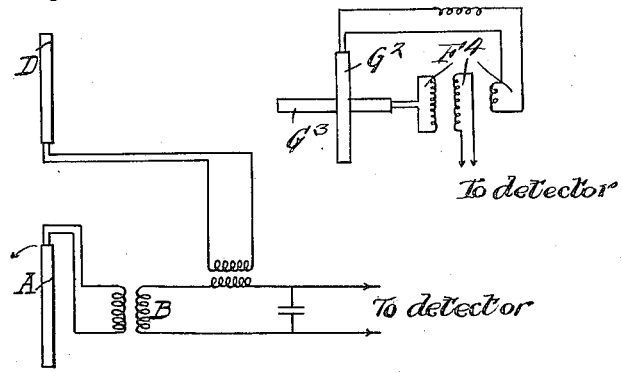
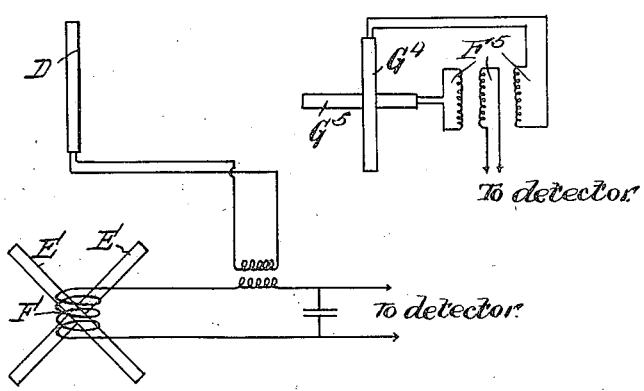
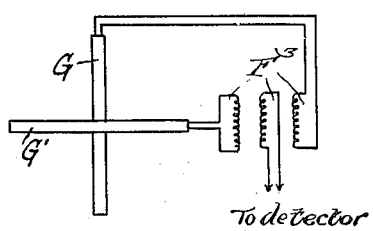
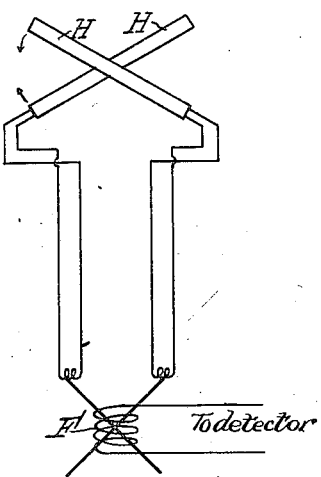
INVENTOR
HENRY J. ROUND
BY Ira J. Adams
ATTORNEY

UNITED STATES PATENT OFFICE.

HENRY JOSEPH ROUND, OF MUSWELL HILL, LONDON, ENGLAND, ASSIGNOR TO RADIO CORPORATION OF AMERICA, OF NEW YORK, N. Y., A CORPORATION OF DELAWARE.

WIRELESS DIRECTION-FINDER.

1,368,657.   Specification of Letters Patent.   Patented Feb. 15, 1921.

Application filed September 13, 1920. Serial No. 410,024.

*To all whom it may concern:*

Be it known that I, HENRY JOSEPH ROUND, a subject of the King of Great Britain, and resident of 9 Woodberry Crescent, Muswell Hill, London, England, have invented a new and useful Improvement in Wireless Direction-Finders, of which the following is a specification.

It has been found that direction finders of the simple rotating frame or Bellini-Tosi type when used on board a ship are seriously affected by the vertical metallic parts of the ship, such as the funnels, masts, mast-guys, etc., and on aeroplanes and airships somewhat similar errors occur.

I have found that in general the error is due to the directional reception of the ship and the retransfer of the energy to the aerial receiving system.

The object of this invention is to provide a wireless direction finder system in which this error shall be obviated.

According to this invention I employ in addition to a rotating frame aerial or a Bellini-Tosi aerial an additional loop aerial which is fixed in a plane parallel to the electrical center line of the ship, and I so couple the circuit of this additional aerial to the circuits of the rotating aerial or of the Bellini-Tosi direction finder that the error caused by the receiving and re-radiating properties of the ship is nullified by the effect of the additional aerial.

According to a modification of the invention I employ a specially constructed Bellini-Tosi system, one member of which is arranged in a plane at right angles to the fore and aft line, while the other, which is preferably electrically connected to the ship, is arranged in the fore and aft line, and I so arrange by the insertion of choke coils or of a loose coupling or by varying the size of one of the frames, that the natural effect of the incoming waves upon the frame in the fore and aft line shall be less than that on the athwartship frame, so as to compensate for the effect due to the metallic parts of the ship.

Again, in place of arranging the two frames of a Bellini-Tosi system fore and aft and athwartship as above described, it may be so arranged that the angle between the two frames may be varied.

My invention is illustrated by the accompanying diagrams in which:

Figure 1 illustrates an arrangement utilizing a frame aerial fixed in the electrical center line and a rotatable frame aerial.

Fig. 2 illustrates a modified arrangement utilizing a fixed loop and a Bellini-Tosi system.

Fig. 3 is a further modification having the frames of a Bellini-Tosi system of unequal size.

Fig. 4 is a modification similar to Fig. 3 in which the effect of one of the frames of a Bellini-Tosi system is diminished by means of a choke coil.

Fig. 5 is a modification similar to Fig. 4 in which one of the frames is more closely coupled to the detector circuit than the other frame.

Fig. 6 is a modification in which the angle between the frames may be varied.

Fig. 1 shows a rotating frame A coupled to an oscillatory circuit B connected to a detector C. D is a frame fixed in the fore and aft line of the ship and coupled to the circuit B in such a way that the effect of the waves incident upon the frame D counteracts the effect of the metallic parts of the ship.

In Fig. 2 E, E, are the frames of a Bellini-Tosi system equally inclined to the fore and aft line of the ship. F represents the usual radiogoniometer commonly used with such arrangements and D is as before a frame in the fore and aft line.

Fig. 3 shows two frames G, G', of an ordinary Bellini-Tosi system, one in the fore and aft line and the other athwartship, the former being of such a size that the natural effect apart from the ship of the incident waves upon it is less than the effect thereof upon the latter.

In Fig. 4 a part of the inductance is used as a choke coil so that the effect of the frame $G^2$ on the detector circuit connected to the radiogoniometer $F^4$ is less than the effect of the frame $G^3$.

In Fig. 5 the circuit of the radiogoniometer $F^5$ which is connected to the detector is more closely coupled with the frame $G^6$ than with the frame $G^4$.

Fig. 6 shows an arrangement in which the two frames H are so mounted that the angle between them can be varied. The angle between the coils of the radiogoniometer F can of course be varied in accordance with the angle between the frames.

What I claim is:—

1. In wireless receiving systems for ships and the like, with interfering conducting structures, a direction finding antenna having a part rotatable in respect to the conducting structures, receiving apparatus and means fixed in relation to the conducting structure whereby the effect of said structure is compensated to give the true direction of signals.

2. In wireless receiving systems for ships and the like, with interfering conducting structures, a direction finder antenna having a part rotatable in respect to the conducting structure, receiving apparatus and means coöperating with the antenna and fixed in relation to the conducting structure whereby the effect thereof on the receiving apparatus is made the same as the true effect of the antenna on the receiving apparatus.

3. In wireless receiving systems for ships and the like, with interfering conducting structures having directional characteristics, a direction finder antenna having a part rotatable in respect to the conducting structure, receiving apparatus and a second directive antenna coöperating with the first antenna and conducting structure fixed in relation to the conducting structure whereby the effect thereof on the receiving apparatus is made the same as the true effect of the first antenna on the receiving apparatus.

4. In wireless receiving systems for ships and the like, with interfering conducting structures, a direction finder antenna including a direction finding coil rotatable in respect to the interfering conducting structure, receiving apparatus and a directive aerial substantially in the fore and aft line of the ship coöperating with the first antenna and conducting structure whereby the effect thereof on the receiving apparatus is made the same as the true effect of the antenna on the receiving apparatus.

5. In wireless receiving systems for ships and the like, with interfering conducting structures, a direction finder antenna rotatable in respect to the interfering conducting structure, receiving apparatus, a second directive antenna in a plane substantially parallel to the electrical center line of the conducting structure and coöperating with the antenna and conducting structure whereby the effect thereof on the receiving apparatus is made the same as the true effect of the antenna on the receiving apparatus.

6. In wireless receiving systems for ships and the like, with interfering conducting structures, a direction finder antenna including a rotatable coil rotatable in respect to the interfering conductive structure, receiving apparatus and a second directive antenna in a plane substantially parallel to the electrical center line of the conducting structure and electrically connected thereto, said second antenna coöperating with the first antenna and a conducting structure whereby the effect of said structure is compensated to give the true direction of signals.

7. In wireless receiving systems for ships and the like, with interfering conducting structures, a direction finder antenna having a part rotatable in respect to the conducting structure, receiving apparatus and a second directive antenna coöperating with the first antenna and conducting structure, said second antenna being fixed in relation to and having its effect substantially equal and opposite to the effect of the conducting structure on the first antenna.

8. In a wireless direction finder on board a ship or the like, the combination with a directive frame aerial system having a part rotatable in respect to the ship or the like, of an additional frame aerial in the fore and aft line of the ship adapted to compensate for the effect of the ship or the like on the first aerial.

In testimony that I claim the foregoing as my invention I have signed my name this twelfth day of August, 1920.

HENRY JOSEPH ROUND.